United States Patent
Enami et al.

(10) Patent No.: US 8,046,613 B2
(45) Date of Patent: Oct. 25, 2011

(54) POWER CONTROL SYSTEM

(75) Inventors: Eiji Enami, Kanagawa (JP); Tetsuya Yano, Kanagawa (JP); Takaaki Shirai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 479 days.

(21) Appl. No.: 12/198,414

(22) Filed: Aug. 26, 2008

(65) Prior Publication Data

US 2009/0077400 A1 Mar. 19, 2009

(30) Foreign Application Priority Data

Sep. 14, 2007 (JP) ................. 2007-240199

(51) Int. Cl.
*G06F 1/26* (2006.01)
(52) U.S. Cl. .............................................. 713/320
(58) Field of Classification Search ........... 713/300–340
See application file for complete search history.

(56) References Cited

U.S. PATENT DOCUMENTS

| | | | | | |
|---|---|---|---|---|---|
| 5,301,334 | A | * | 4/1994 | Horiuchi ........................ | 713/330 |
| 5,648,799 | A | * | 7/1997 | Kikinis ......................... | 345/212 |
| 5,832,237 | A | * | 11/1998 | Lee ............................. | 710/303 |
| 5,884,086 | A | * | 3/1999 | Amoni et al. ................. | 713/300 |
| 6,097,616 | A | | 8/2000 | Iwasaki | |
| 6,209,105 | B1 | * | 3/2001 | Hamamoto ................... | 713/300 |
| 6,408,395 | B1 | * | 6/2002 | Sugahara et al. .............. | 713/310 |
| 6,476,836 | B2 | | 11/2002 | Enami | |
| 6,516,374 | B1 | * | 2/2003 | Kinoshita et al. ............. | 710/304 |
| 6,567,921 | B1 | * | 5/2003 | Guziak ......................... | 713/322 |
| 6,594,767 | B1 | * | 7/2003 | Wiley et al. ................... | 713/300 |
| 6,606,705 | B1 | * | 8/2003 | Volk ............................. | 713/100 |
| 6,622,178 | B1 | * | 9/2003 | Burke et al. .................. | 710/15 |
| 6,920,571 | B2 | * | 7/2005 | Shaver et al. ................. | 713/310 |
| 6,928,562 | B2 | * | 8/2005 | Cohen et al. .................. | 713/320 |
| 7,069,462 | B2 | * | 6/2006 | Owen et al. ................... | 713/502 |
| 7,177,969 | B2 | * | 2/2007 | Croyle .......................... | 710/305 |
| 7,219,240 | B2 | * | 5/2007 | O ................................. | 713/300 |
| 7,243,249 | B1 | * | 7/2007 | Dunstan et al. ............... | 713/310 |
| 7,290,161 | B2 | * | 10/2007 | Kahn ............................ | 713/500 |
| 7,773,076 | B2 | * | 8/2010 | Pittel et al. ................... | 345/179 |
| 7,805,623 | B2 | * | 9/2010 | Jia et al. ....................... | 713/300 |
| 2005/0211692 | A1 | | 9/2005 | Maitani | |
| 2007/0057961 | A1 | | 3/2007 | Enami et al. | |
| 2007/0071479 | A1 | | 3/2007 | Semma et al. | |

(Continued)

FOREIGN PATENT DOCUMENTS

CN 1673883 A 9/2005

(Continued)

OTHER PUBLICATIONS

Office Action issued Jun. 13, 2011, in Japanese Patent Application No. 2007-240199 filed Sep. 14, 2007.

*Primary Examiner* — Paul Myers
(74) *Attorney, Agent, or Firm* — Oblon, Spivak, McClelland, Maier & Neustadt, L.L.P.

(57) ABSTRACT

A power mode designating unit of a main system outputs an operation mode designating signal to a sub system. Upon shifting from the normal operation mode to the power-saving mode, a control unit of the sub system outputs a power-saving mode shift enable signal indicating that shifting to the power-saving mode is possible to a power control unit of the sub system. When the operation mode designating signal designates the power-saving mode and the power-saving mode shift enable signal indicates that shifting to the power-saving mode is possible, the power control unit supplies a power-saving mode voltage to the control unit.

9 Claims, 11 Drawing Sheets

| U.S. PATENT DOCUMENTS | | | |
|---|---|---|---|
| 2007/0098433 A1 | 5/2007 | Yano et al. | |
| 2007/0200432 A1 | 8/2007 | Yano et al. | |
| 2007/0201894 A1 | 8/2007 | Kishi et al. | |
| 2007/0212102 A1 | 9/2007 | Yano | |
| 2007/0234083 A1* | 10/2007 | Lee | 713/300 |
| 2007/0277048 A1* | 11/2007 | Yamasaki | 713/310 |
| 2008/0049250 A1* | 2/2008 | Sugishita | 358/1.15 |

| FOREIGN PATENT DOCUMENTS | | |
|---|---|---|
| JP | 11-282427 | 10/1999 |
| JP | 2001-337789 | 12/2001 |
| JP | 2003-131766 | 5/2003 |
| JP | 2005-234784 | 9/2005 |
| JP | 2005-234989 | 9/2005 |

\* cited by examiner

POWER CONTROL SYSTEM

CROSS-REFERENCE TO RELATED APPLICATIONS

The present application claims priority to and incorporates by reference the entire contents of Japanese priority document 2007-240199 filed in Japan on Sep. 14, 2007.

BACKGROUND OF THE INVENTION

1. Field of the Invention

The present invention relates to a power control system, more specifically, to a power control system that shifts an operation mode of a sub system connected to a main system to a power-saving mode or a normal operation mode.

2. Description of the Related Art

Recently, power saving control of central processing unit (CPU) employed in an image forming apparatus is more sophisticated compared with the conventional one. For example, in a power-saving mode, by retaining operation information of CPU while reducing the power supply voltage to such a voltage with which the CPU itself is not operable, electric power consumption in the power-saving mode is saved.

In an image forming apparatus having a main system and a sub system, operation mode of the sub system is shifted to a power-saving mode by outputting a command for stopping supply of power to the subsystem, to a power supply control unit that supplies each sub system with power from the main system, thereby reducing supply voltage to the sub system.

However, in shifting to the power-saving mode, when there is a process under processing in the sub system, there arises a problem that the mode shifts to the power-saving mode before completion of the process. There is also a problem that a CPU cannot be activated because of low supply voltage even when an activation signal for activating the CPU is output to the CPU in the condition that the power supply voltage is reduced to such a voltage with which operation of the CPU for sub system control itself is disabled, in the power-saving mode of the sub system.

Japanese Patent Application Laid-open No. 2003-131766 discloses a technique that solves the problem by controlling a timing of shifting to the power-saving mode of the system, and a timing of outputting an activation signal for returning from the power-saving mode of the system by means of a timer.

However, in the conventional art, in conducting power supply control, power supply management is generally realized by using a sub microcomputer or a special device, however, use of such a sub microcomputer or a special device exclusively for the purpose of power supply management will result in increases in production cost and circuit scale and hence is undesirable from the view point of substrate implementation area.

SUMMARY OF THE INVENTION

It is an object of the present invention to at least partially solve the problems in the conventional technology.

According to an aspect of the present invention, there is provided a power control system including a main system that controls the power control system and a sub system that is connected to the main system in a communicatable manner and that implements various functions. The main system includes a power mode designating unit that outputs an operation mode designating signal that designates either one of a normal operation mode and a power-saving mode to the sub system. The sub system includes a control unit that controls the sub system and a power control unit that supplies, in the normal operation mode, a first voltage with which driving of the control unit is possible to the control unit, while in the power-saving mode, supplies a second voltage that is lower than the first voltage, with which driving of the control unit is impossible but retention of condition is possible, to the control unit. When shifting to the power-saving mode is possible, the control unit outputs a power-saving mode shift enable signal indicating that shifting to the power-saving mode is possible to the power control unit. When the operation mode designating signal designates the power-saving mode and the power-saving mode shift enable signal indicates that shifting to the power-saving mode is possible, the power control unit supplies the second voltage to the control unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. The present invention is not limited by the preferred embodiments. Constituents in these embodiments embrace those easily conceived by persons skilled in the art and substantially equivalent. In the present embodiments, the case the power supply system according to the present invention is applied to the image forming apparatus will be explained.

Figure 1:
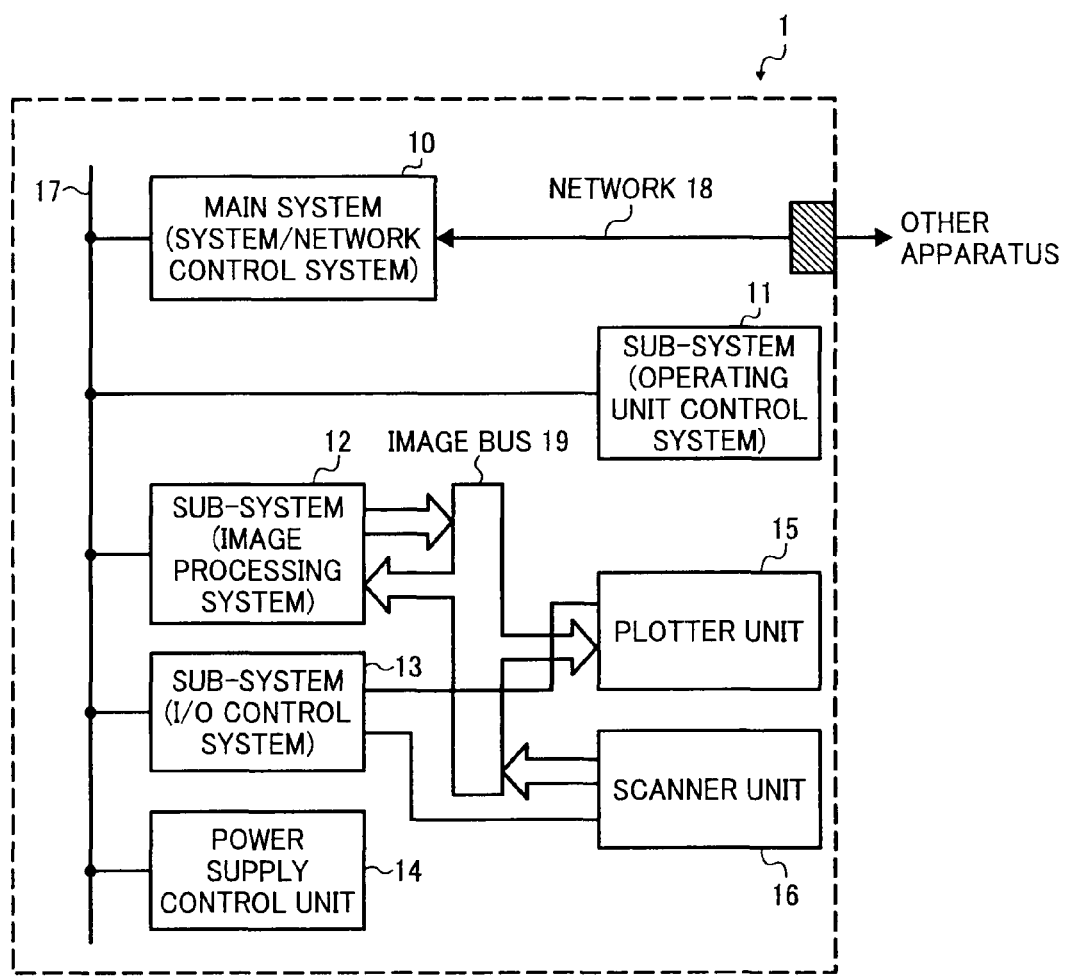
FIG. 1 is a view of a configuration of an image forming apparatus according to a first embodiment of the present invention.

FIG. 1 is a view of a configuration of an image forming apparatus 1 according to a first embodiment of the present invention. As shown in FIG. 1, the image forming apparatus 1 is made up of combination of a plurality of units, and each unit includes a system/network control system (hereinafter, "main system") 10, an operating unit control system 11, an image processing system 12, an input/output (I/O) control system 13, a power supply control unit 14, a plotter unit 15, and a scanner unit 16.

The operating unit control system 11, the image processing system 12, the I/O control system 13, the power supply control unit 14, the plotter unit 15, and the scanner unit 16 are connected to the main system 10 via a communication control line 17.

The main system 10 controls the image forming apparatus 1. The main system 10 sends and receives a command to/from each unit constituting the image forming apparatus 1 via the communication control line 17, thereby controls each unit. The main system 10 controls data communication with other apparatus via a network 18.

The operating unit control system 11 has an operation input function for a user to input a command, and a display function for providing a user with information. The image processing system 12 conducts various image processes on image data captured in the scanner unit 16 or image data received via the network 18. The image processing system 12 outputs image data after process to the plotter unit 15. Transfer of such image data is executed via an image bus 19.

The I/O control system 13 controls input/output of a signal with respect to an actuator of the plotter unit 15 or the scanner unit 16. The power supply control unit 14 provides each unit with direct current (DC) power to be consumed by each unit.

The plotter unit 15 achieves printing function by combination of a plurality of actuators such as an image forming system, a fixing system, a paper conveying system and the like. The scanner unit 16 includes an optical system, a running member, and a motor for activating the running member and so on, and scans a document face and captures image data.

The image forming apparatus 1 having the configuration has a normal operation mode and a power-saving mode as its power consumption mode, and the main system 10 controls execution in the normal operation mode and in the power-saving mode. The normal operation mode is a standby state where input of command or data can be accepted, and a process of forming images or a process according to the received command or data can be immediately executed. The power-saving mode is a standby state where power consumption of the image forming apparatus 1 is reduced compared with the normal operation mode. The standby state in the normal operation mode is the state where all units are energized. Contrarily, in the power-saving mode, only a minimum required unit for accepting a command or data is energized, so that power consumption of the image forming apparatus 1 is reduced.

In the power-saving mode, the power supply control unit 14 executes supply of voltage only for the main system 10 and the operating unit control system 11 according to an instruction command from the main system 10, while stopping supply of voltage to other units. Upon satisfaction of a predetermined condition, the operating unit control system 11 lowers driving voltage for a sub CPU 40 (see FIG. 2). Such control allows waiting of a command in the main system 10, and realizes reduction in power consumption in the image forming apparatus 1.

Figure 2:
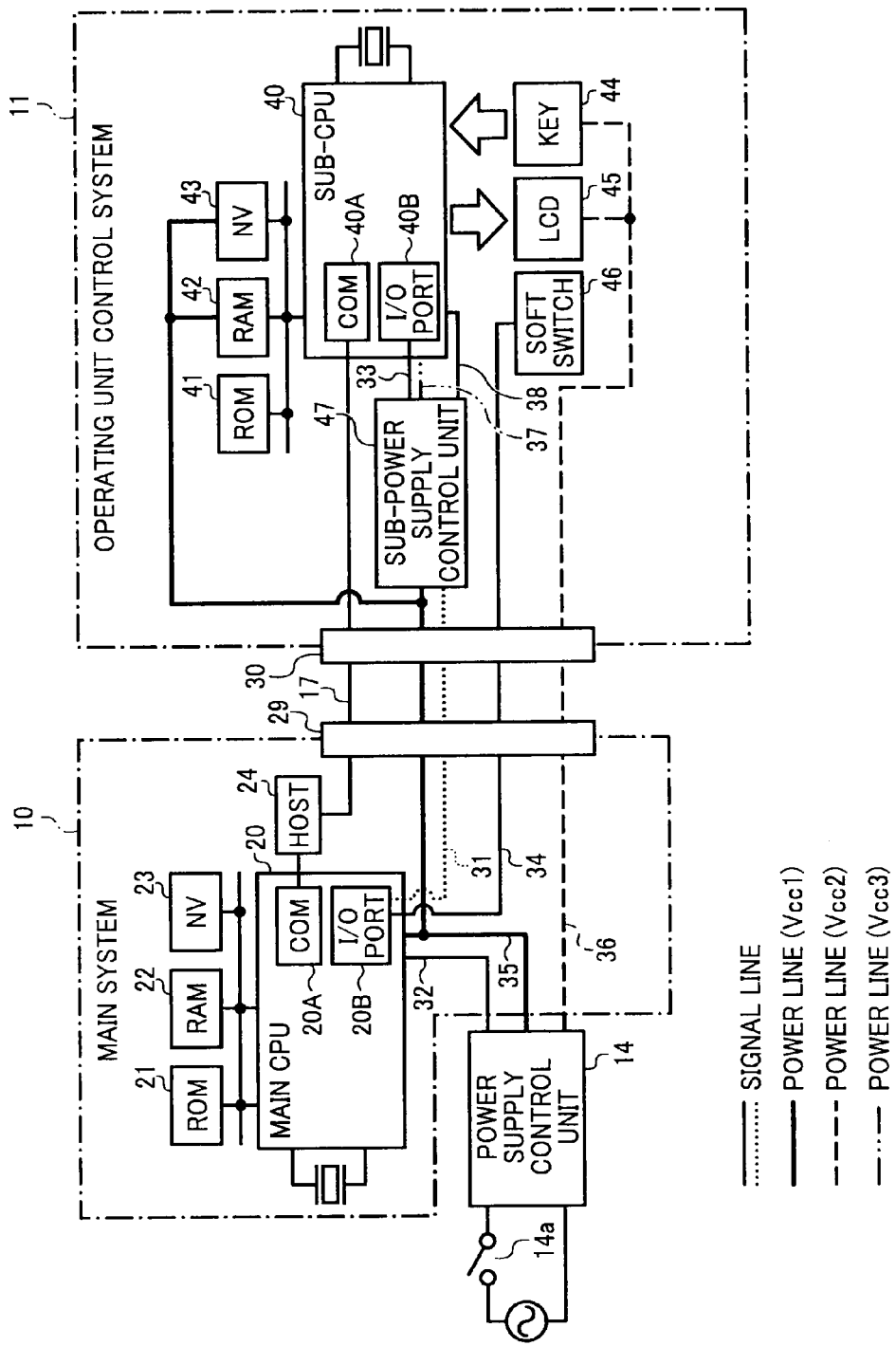
FIG. 2 is a view of internal configurations of a main system and an operating unit control system shown in FIG. 1.

FIG. 2 is a view of internal configurations of the main system 10 and the operating unit control system 11. As shown in FIG. 2, the main system 10 includes a main CPU (power mode designating unit) 20, a read only memory (ROM) 21, a random access memory (RAM) 22, a non-volatile memory (hereinafter "NV") 23, and a host 24. The main system 10 and the operating unit control system 11 are connected via connectors 29 and 30 in a data communicatable manner.

The main CPU 20 of the main system 10 controls the main system 10. The main CPU 20 has a communication part (com) 20A, and an I/O port 20B, and controls communication with each sub system via these parts. The main CPU 20 outputs an operation mode designating signal that designates operation in the normal operation mode or operation in the power-saving mode (power-saving mode "H", normal power mode "L") to the operating unit control system 11 via a data line 31. The main CPU 20 outputs a command that indicates ON/OFF of output of supply voltage to the power supply control unit 14 via a data line 32.

The ROM 21 stores various data and various programs to be executed by the main CPU 20. The RAM 22 temporarily stores various data and various programs when the main CPU 20 executes various programs. The NV 23 stores various initial values and various set values in the image forming apparatus 1. The host 24 controls communication between the communication part (Com) 20A of the main CPU 20 and the operating unit control system 11 via the communication control line 17.

The operating unit control system 11 includes a sub CPU 40 (control unit), a ROM 41, a RAM 42, a NV 43, a key input device (hereinafter, "KEY") 44, a liquid crystal display (LCD) 45, a soft switch 46, and a sub power supply control unit 47, and is connected with the main system 10 via a connector 30.

The sub CPU 40 controls the operating unit control system 11, includes a communication part (Com) 40A and an I/O port 40B, and controls communication with the main system 10 via these parts. The sub CPU 40 outputs a power-saving mode shift possible/impossible signal (shift possible "H", shift impossible "L") that indicates whether shifting to the power-saving mode is possible or impossible, to the sub power supply control unit 47, via a data line 33.

The ROM 41 stores various data and various programs to be executed by the sub CPU 40. The RAM 42 temporarily stores various data and various programs when the sub CPU 40 executes various programs. The NV 43 stores various initial values and various set values in the image forming apparatus 1. The NV 43 stores various programs such as LCD module for displaying information on the LCD 45 and various data for display such as screen data.

The KEY 44 and the LCD 45 function as user interfaces. The KEY 44 includes operation buttons and operation keys for allowing a user to input instruction. The LCD 45 is display panels, and display information to a user.

The soft switch 46 is a switch to be operated by a user for controlling ON/OFF of the power-saving mode, and outputs a switch signal that indicates ON/OFF of shifting to the power-saving mode according to an operation by a user, to the main CPU 20 via a data line 34 and the I/O port 20B.

The main CPU 20 detects change of the switch signal, and outputs a command that indicates stopping of output of supply voltage (hereinafter, "output stop command") to the power supply control unit 14 via the data line 32, when the switch signal indicates ON of the power-saving mode. When the switch signal indicates OFF of the power-saving mode, or indicates return to the normal operation mode, the main CPU 20 outputs a command that indicates starting of output of supply voltage (hereinafter "output start command") to the power supply control unit 14 via the data line 32.

The power supply control unit 14, the main CPU 20, the sub power supply control unit 47, and the RAM 42 and the NV 43 of the operating unit control system 11 are connected via a power line 35. The power supply control unit 14 supplies the main CPU 20, the sub power supply control unit 47, and the RAM 42 and the NV 43 of the operating unit control system 11 with voltage (Vcc1) via the power line 35.

The power supply control unit 14, and the KEY 44 and the LCD 45 of the operating unit control system 11 are connected via a power line 36. The power supply control unit 14 supplies the KEY 44 and the LCD 45 with voltage (Vcc2) via the power line 36.

Figure 3:
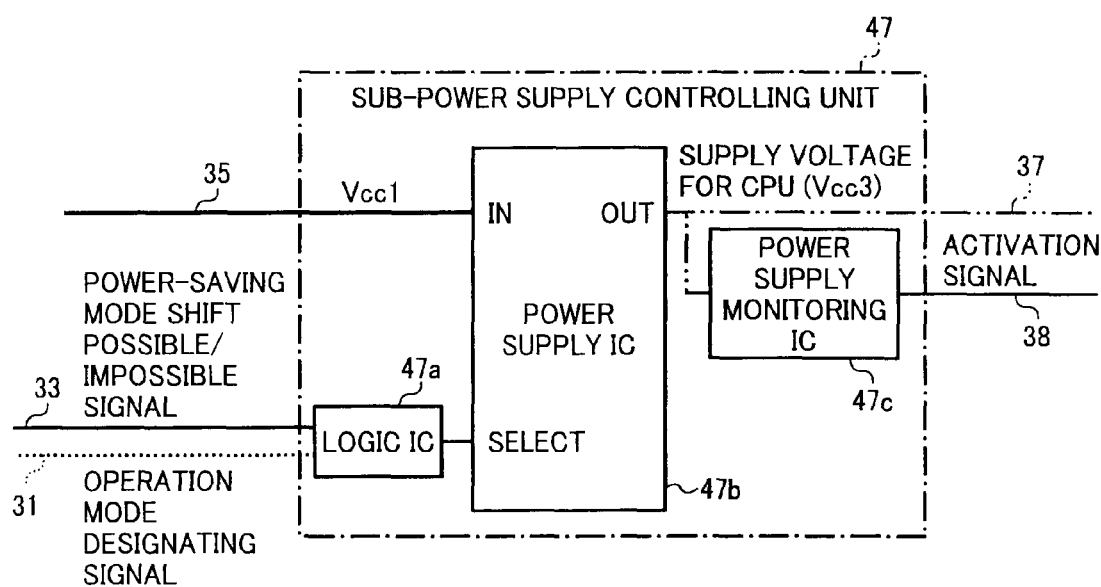
FIG. 3 is a view of an internal configuration of a sub power supply control unit shown in FIG. 2.

FIG. 3 is a view of an internal configuration of the sub power supply control unit 47. The sub power supply control unit 47 includes a logic IC 47a that executes logical AND operation of a operation mode designating signal and a power-saving mode shift possible/impossible signal, a power supply IC 47b that controls output voltage to the sub CPU 40 based on an operation result in the logic IC 47a, and a power supply monitoring IC 47c that monitors output voltage from the power supply IC 47b.

The logic IC 47a executes logic AND operation of an operation mode designating signal (power-saving mode "H", normal power mode "L") output from the main CPU 20 and a power-saving mode shift possible/impossible signal (shift possible "H", shift impossible "L") output from the sub CPU 40, and outputs the operation result (H/L) to the power supply IC 47b.

The power supply IC 47b is implemented, for example, by a linear regulator or a DC-DC converter, and converts the level of the voltage (Vcc1) input from the power supply control unit 14 based on the operation result (H/L) input from the logic IC 47a, and outputs it to the sub CPU 40 as a supply voltage for CPU (Vcc3) via a power line 37.

Concretely, when the operation result ("L") is input from the logic IC 47a, the power supply IC 47b supplies the sub CPU 40 with a first voltage with which driving of the sub CPU 40 is possible, as supply voltage for CPU (Vcc3). On the other hand, when the operation result ("H") is input from the logic IC 47a (power-saving mode shift possible/impossible signal (shift possible "H"), and operation mode designating signal (power-saving mode "H")), the power supply IC 47b supplies the sub CPU 40 with a second voltage which is lower than the first voltage, with which driving of the sub CPU 40 is not possible but retention of condition is possible, as a supply voltage for CPU (Vcc3).

The power supply monitoring IC 47c monitors supply voltage for CPU (Vcc3) output from the power supply IC 47b, and outputs an activation signal (interrupt signal) to the sub CPU 40 via a data line 38 when the supply voltage for CPU (Vcc3) reaches the first voltage during shifting from the power-saving mode to the normal operation mode.

The logic IC 47a, the power supply IC 47b, and the power supply monitoring IC 47c of the sub power supply control unit 47 can be implemented by an inexpensive general-purpose article, so that an expensive device specially provided for control of power supply is no longer required, and a low cost configuration can be realized. As a method of selecting output voltage, a method of changing output voltage level by controlling a resistance voltage dividing circuit for setting reference voltage by means of a field-effect transistor or the like may be employed besides the method of inputting to an output level setting terminal of the power supply IC 47b as shown in FIG. 3.

In the image forming apparatus 1 having the configuration, in the normal operation mode, Vcc1 and Vcc2 are output from the power supply control unit 14, and from the sub power supply control unit 47, the first voltage (normal mode voltage) with which the sub CPU 40 is operable is supplied to the sub CPU 40 as supply voltage for CPU (Vcc3). On the other hand, in the power-saving mode, supply of Vcc2 is blocked so as to avoid unnecessary power consumption of the unit, and the second voltage (power-saving mode voltage) which is lower than the first voltage, with which driving of the sub CPU 40 is not possible but retention of condition is possible, is supplied to the sub CPU 40 as supply voltage for CPU (Vcc3), thereby reducing power consumption.

Figure 4:
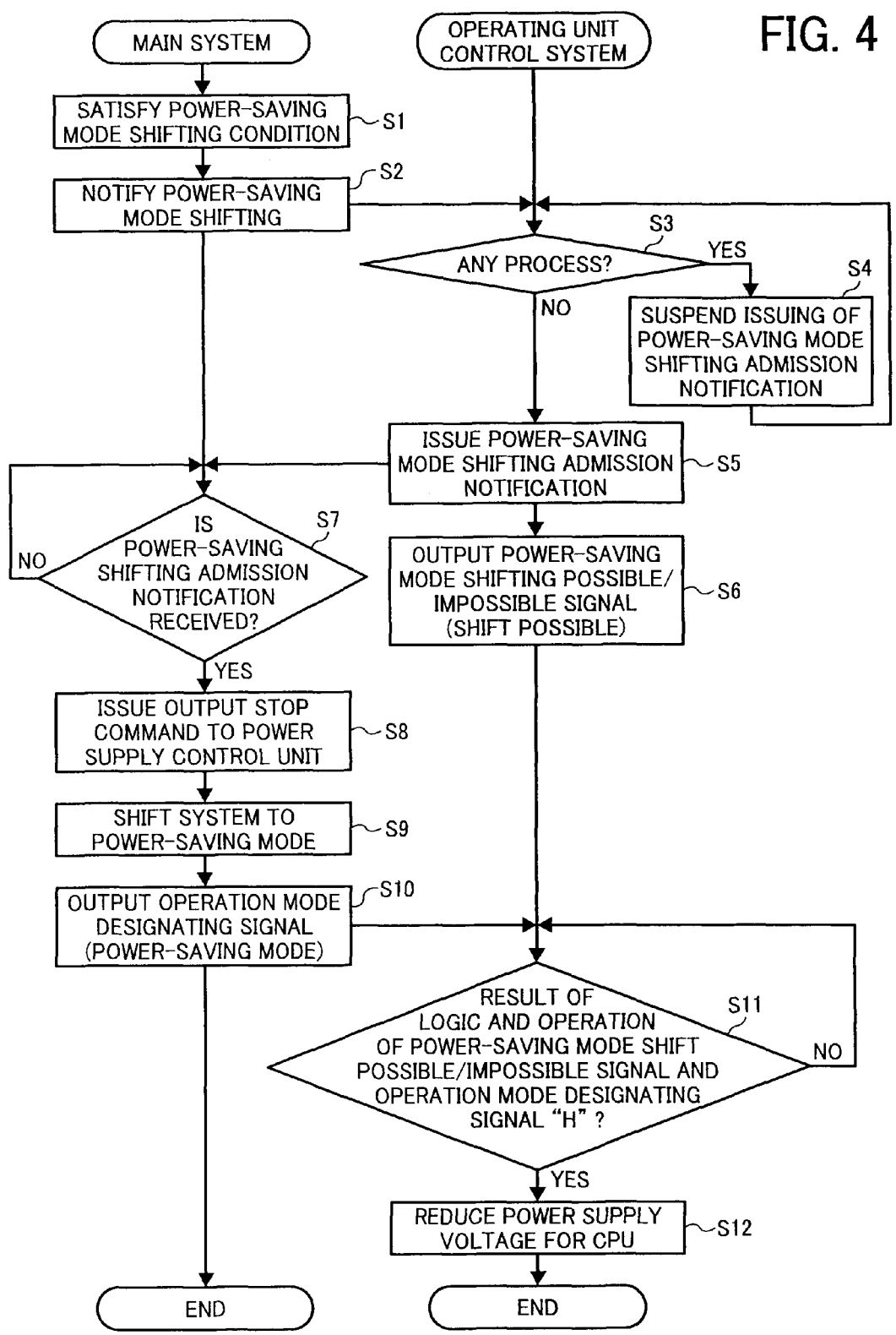
FIG. 4 is a flowchart of sequence of a process of shifting to the power-saving mode executed between the main system and the operating unit control system.

A shifting process of shifting to the power-saving mode conducted between the main system 10 and the operating unit control system 11 in the configuration will be explained with reference to FIG. 4. FIG. 4 is a flow chart indicating sequence of a process of shifting to power-saving mode executed between the main system 10 and the operating unit control system 11.

When the shifting condition to power-saving mode is satisfied (Step S1) in standby mode of the image forming apparatus 1, the main system 10 issues a power-saving mode shifting notification to the operating unit control system 11 (Step S2). Here, the case of the shifting condition to power-saving mode is satisfied generally means when the input of command is not made over a certain time, or the case of a power-saving mode shifting command, for example, by pressing of the soft switch 46 is accepted. This shifting condition is stored in advance, for example, in the ROM 21 of the main system 10.

When a power-saving mode shifting notification is issued in Step S2, the operating unit control system 11 determines whether there is a process under processing (Step S3), and when there is a process under processing ("Yes" in Step S3), issuing of a power-saving mode shifting admission notification is suspended (Step S4), whereas when there is no process under processing ("No" in Step S3), a power-saving mode shifting admission notification is issued for the main system 10 (Step S5).

And the sub CPU 40 stops driving the communication control line 17, and outputs to the sub power supply control unit 47, a power-saving mode shift possible/impossible signal ("H") indicating the condition where shifting to the power-saving mode is possible, via the data line 33 (Step S6), thereby shifting to the power-saving mode. In this case, since energizing to the RAM 42 is continued, information of the image formation system on the RAM 42 is properly stored in the power-saving mode.

Upon reception of power-saving shifting admission notification from all of the units (including the operating unit control system 11) ("Yes" in Step S7), the main system 10 issues an output stop command to the power supply control unit 14 via the data line 32 (Step S8), and shifts the main system 10 to the power-saving mode (Step S9).

Then, the main system 10 outputs an operation mode designating signal ("H") designating operation in the power-saving mode to the sub power supply control unit 47 of the operating unit control system 11 via the data line 31 (Step S10).

In the sub power supply control unit 47, when a result of logic AND operation of power-saving mode shift possible/impossible signal and operation mode designating signal executed in the logic IC 47a is "H" ("Yes" in Step S11), the power supply IC 47b sets power supply voltage for CPU (Vcc3) at the second voltage which is lower than the first voltage, with which driving of the sub CPU 40 is not possible but retention of condition is possible (Step S12). By executing the processes, power-saving operation of the operating unit control system 11 can be realized.

Figure 5:
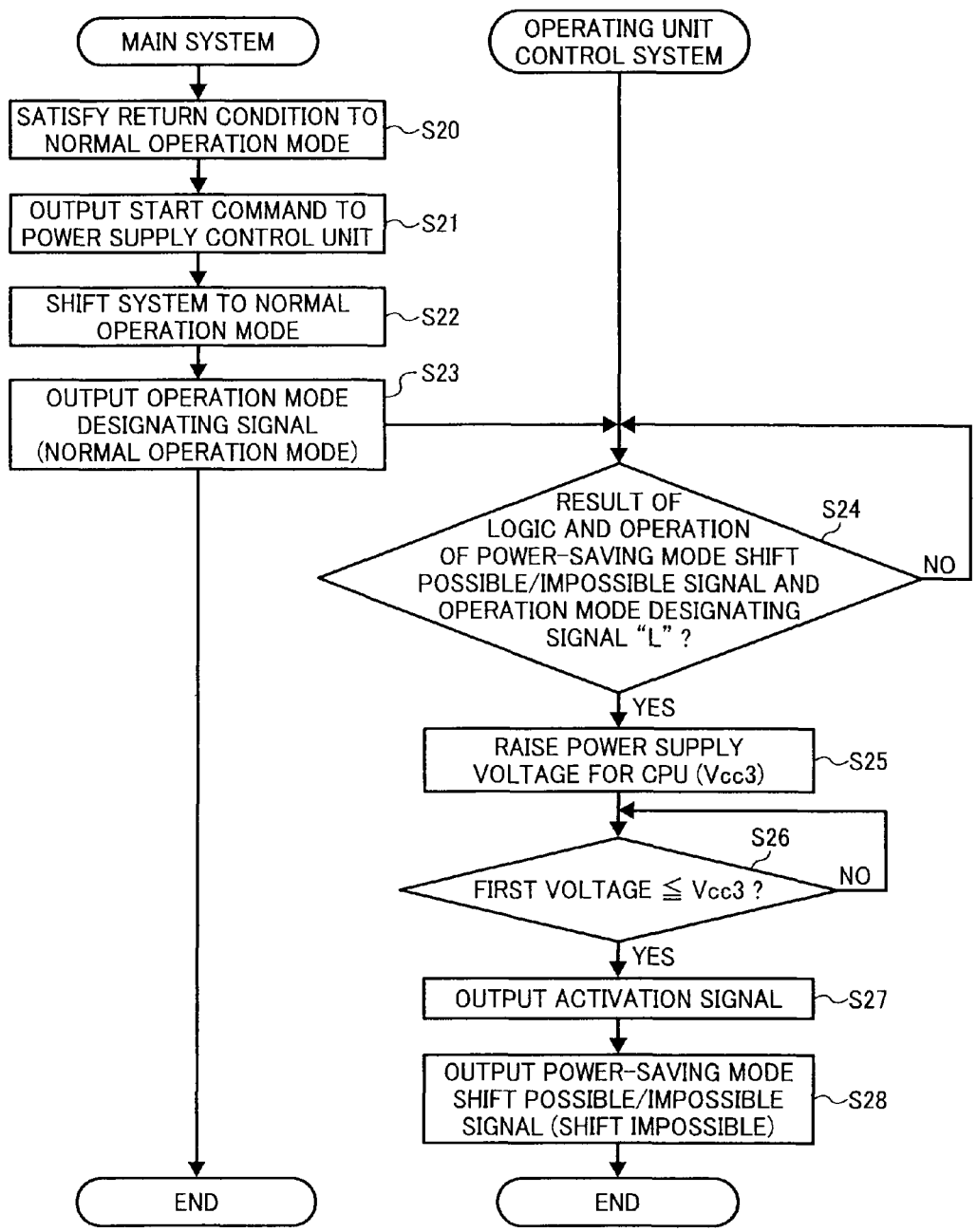
FIG. 5 is a flowchart of sequence of a process of shifting to the normal operation mode executed between the main system and the operating unit control system.

Subsequently, a shifting process to the normal operation mode conducted between the main system 10 and the operating unit control system 11 will be explained with reference to FIG. 5. FIG. 5 is a flow chart of sequence of a process of shifting to the normal operation mode executed between the main system 10 and the operating unit control system 11.

When a return condition to the normal operation mode is satisfied (Step S20), the main system 10 determines return from the power-saving mode to the normal operation mode. The case of return condition to the normal operation mode is satisfied includes, for example, when a switch signal indicating OFF of shifting to the power-saving mode is output from the soft switch 46 via the data line 34 upon pressing of the soft switch 46, and input to the main CPU 20, and when data is received from other apparatus via the network 18. This return condition to the normal operation mode is stored in advance, for example, in the ROM 21 of the main system 10.

The main system 10 outputs an output start command to the power supply control unit 14 via the data line 32 (Step S21), and shifts the main system 10 to the normal operation mode (Step S22).

The main system 10 outputs operation mode designating signal ("L") designating operation in the normal operation mode to the sub power supply control unit 47 of the operating unit control system 11 via the data line 31 (Step S23).

On the other hand, in the sub power supply control unit 47 of the operating unit control system 11, when a result of logic AND operation of power-saving mode shift possible/impossible signal and operation mode designating signal executed in the logic IC 47a is "L" ("Yes" in Step S24), the power supply IC 47b raises power supply voltage for CPU (Vcc3) to the first voltage with which driving of the sub CPU 40 is possible from the second voltage (Step S25).

The power supply monitoring IC 47c monitors the power supply voltage for CPU (Vcc3), and outputs an activation signal to the sub CPU 40 via the data line 38 when the power supply voltage for CPU (Vcc3) becomes the first voltage with which driving of the sub CPU 40 is possible ("Yes" in Step S26) (Step S27). The sub CPU 40 is activated by detecting the activation signal by external interruption, and following the activation, it outputs power-saving mode shift possible/impossible signal ("L") indicating that shifting to the power-saving mode is impossible, to the sub power supply control unit 47 (Step S28), to be ready for the next shifting to the power-saving mode.

As explained, according to the first embodiment, the main system 10 outputs an operation mode designating signal designating normal operation mode or power-saving mode to the operating unit control system 11. The operating unit control system 11 has the sub CPU 40 that controls the operating unit control system 11 and the sub power supply control unit 47 that controls the power supply in the operating unit control system 11 and supplies the sub CPU 40 with the first voltage with which driving of the sub CPU 40 is possible in the normal operation mode, while supplying the sub CPU 40 with the second voltage which is lower than the first voltage, with which driving of the sub CPU 40 is impossible but retention of condition is possible in the power-saving mode. In shifting from normal operation mode to power-saving mode, the sub CPU 40 outputs a power-saving mode shift possible/impossible signal indicating that shifting to the power-saving mode is possible, when shifting to the power-saving mode is possible, to the sub power supply control unit 47, and the sub power supply control unit 47 supplies the sub CPU 40 with the second voltage when the operation mode designating signal designates power-saving mode, and the power-saving mode shift possible/impossible signal indicates that shifting to the power-saving mode is possible. Therefore, it is possible to simplify the power supply control for the sub CPU 40, and to construct a power supply control system which is suited for the power-saving mode by an inexpensive configuration. As a result, it is possible to provide a power control system capable of saving power consumption by a low-cost and small-scale circuit configuration.

Further, according to the first embodiment, in shifting from the power-saving mode to the normal operation mode, the sub power supply control unit 47 outputs an activation signal to the sub CPU 40 to activate the same when it detects that the driving voltage of the sub CPU 40 becomes the first voltage. Therefore, in returning from the power-saving mode to the normal operation mode, it is possible to activate the sub CPU 40 with simple power supply control in the condition that the driving voltage is lowered to the second voltage with which the sub CPU 40 itself is not operable.

In the first embodiment, although the operating unit control system 11 is explained as a representative, for the configuration of the sub system and the shifting sequence to the power-saving mode, the present invention may be applied to other sub systems without limited thereto.

Figure 6:
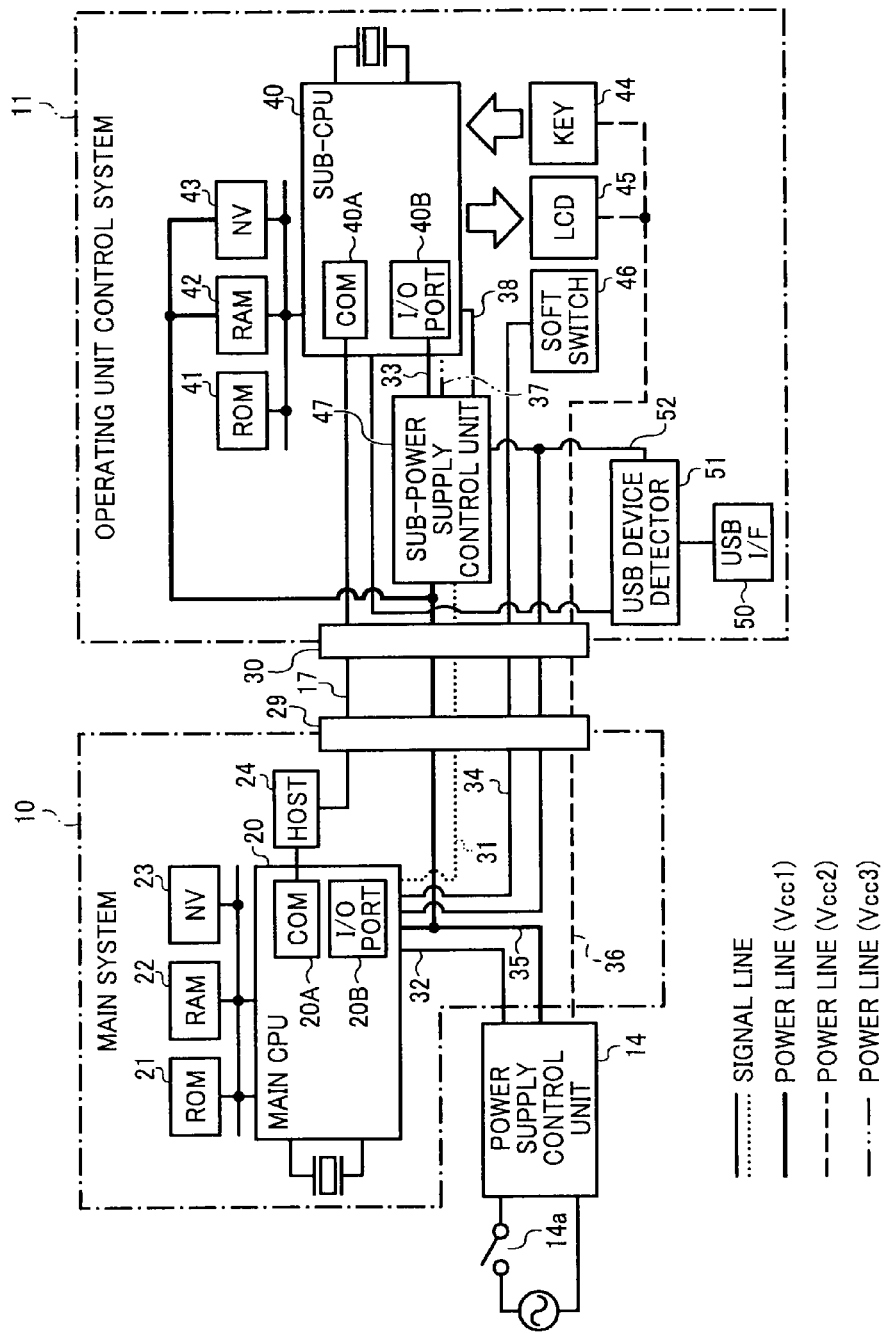
FIG. 6 is a view of a configuration of an image forming apparatus of a second embodiment of the present invention.

FIG. 6 is a view of a configuration of an image forming apparatus according to a second embodiment of the present invention. In the second embodiment, explanation of the part which is common to that in the image forming apparatus 1 according to the first embodiment is omitted, and only different points will be explained.

As shown in FIG. 6, the image forming apparatus according to the second embodiment further includes a USB I/F 50 and a USB device detector 51 in the operating unit control system 11 in the configuration according to the first embodiment (FIG. 2) and when the USB device detector 51 detects that a USB device is connected to the USB I/F 50 in the power-saving mode, the sub power supply control unit 47 activates the sub CPU 40.

The USB I/F 50 is provided for connecting a USB device. The USB device detector 51 outputs a device detection signal to the sub power supply control unit 47 and the main system 10 via a data line 52 when it detects that a USB device is connected to the USB I/F 50.

Next, an operation when connection of a USB device is detected in the power-saving mode will be explained. The operation of shifting to the power-saving mode is as same as that in the first embodiment. The image forming apparatus is in the power-saving mode (the operation mode designating signal designates power-saving mode ("H"), the power-saving mode shift possible/impossible signal indicates shift possible ("H"), and the power supply voltage for CPU (Vcc3) is the second voltage with which driving of the sub CPU 40 is not possible but retention of condition is possible).

When a USB device is connected to the USB I/F 50 in the power-saving mode, the USB device detector 51 detects that USB device is connected, and outputs a device detection signal to the sub power supply control unit 47 and the main system 10 via the data line 52.

The sub power supply control unit 47 raises the power supply voltage for CPU (Vcc3) from the second voltage to the first voltage with which driving of the sub CPU 40 is possible when the device detection signal is input, and outputs an activation signal to the sub CPU 40 via the data line 38 when the power supply voltage for CPU (Vcc3) reaches the first voltage. The sub CPU 40 is activated by detecting the activation signal by external interrupt, and following to the activation, it outputs a power-saving mode shift possible/impossible signal ("L") indicating the condition that shifting to the power-saving mode is impossible, to the sub power supply control unit 47 and then is ready for the next shifting to the power-saving mode.

According to the second embodiment, in the power-saving mode, when the USB device detector 51 detects that a USB device is connected to the USB I/F 50, the sub power supply control unit 47 raises the driving voltage of the sub CPU 40 to the first voltage, and sends a driving signal to the sub CPU 40 to activate the same. Therefore, returning from the power-saving mode to the normal operation mode is achieved in a shorter time compared to the case where after the main system 10 detects connection of a USB device, the operation mode designating signal is changed, and the driving voltage of the sub CPU 40 is raised to the first voltage.

Figure 7:
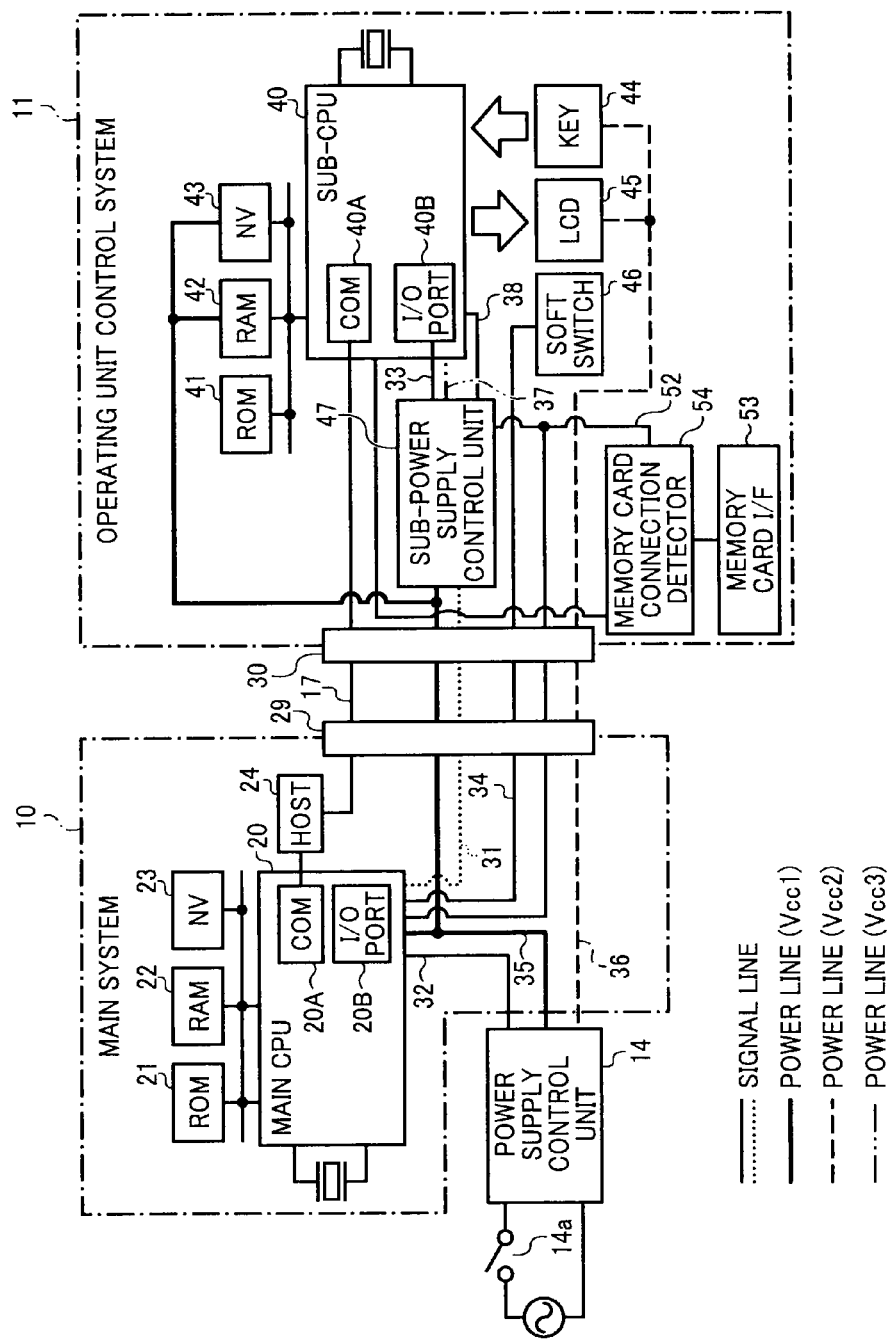
FIG. 7 is a view of a configuration of an image forming apparatus of a third embodiment of the present invention.

FIG. 7 is a view of a configuration of an image forming apparatus according to a third embodiment of the present invention. In the third embodiment, explanation of the part common to that in the image forming apparatus 1 according to the first embodiment is omitted, and only different points will be explained.

As shown in FIG. 7, the image forming apparatus according to the third embodiment further includes a memory card I/F 53, and a memory card connection detector 54 in the operating unit control system 11 in the configuration according to the first embodiment (FIG. 2), and in the power-saving mode, when the memory card connection detector 54 detects that a memory card is connected to the memory card I/F 53, the sub power supply control unit 47 activates the sub CPU 40.

In FIG. 7, the memory card I/F 53 is an interface provided for connection of a memory card. Upon detecting that a memory card is connected to the memory card I/F 53, the memory card connection detector 54 outputs a device detection signal to the sub power supply control unit 47 and the main system 10 via the data line 52.

Next, an operation when connection of a memory card is detected in the power-saving mode will be explained. The operation of shifting to the power-saving mode is as same as that in the first embodiment. The image forming apparatus is in the power-saving mode (the operation mode designating signal designates power-saving mode ("H"), the power-saving mode shift possible/impossible signal indicates shift possible ("H"), and the power supply voltage for CPU (Vcc3) is the second voltage with which driving of the sub CPU 40 is not possible but retention of condition is possible).

When a memory card is connected to the memory card I/F 53 in the power-saving mode, the memory card connection detector 54 detects that the memory card is connected, and outputs a device detection signal to the sub power supply control unit 47 and the main system 10 via the data line 52.

The sub power supply control unit 47 raises the power supply voltage for CPU (Vcc3) from the second voltage to the first voltage with which driving of the sub CPU 40 is possible when the device detection signal is input, and outputs an activation signal to the sub CPU 40 via the data line 38 when the power supply voltage for CPU (Vcc3) reaches the first voltage. The sub CPU 40 is activated by detecting the activation signal by external interrupt, and following the activation, it outputs a power-saving mode shift possible/impossible signal ("L") indicating the condition that shifting to the power-saving mode is impossible, to the sub power supply control unit 47, and then is ready for the next shifting to the power-saving mode.

According to the third embodiment, in the power-saving mode, when the memory card connection detector 54 detects that a memory card is connected to the memory card I/F 53, the sub power supply control unit 47 raises the driving voltage of the sub CPU 40 to the first voltage, and sends a driving signal to the sub CPU 40 to activate the same. Therefore, returning from the power-saving mode to the normal operation mode is achieved in a shorter time compared to the case where after the main system 10 detects connection of a memory card, the operation mode designating signal is changed, and the driving voltage of the sub CPU 40 is raised to the first voltage.

Figure 8:
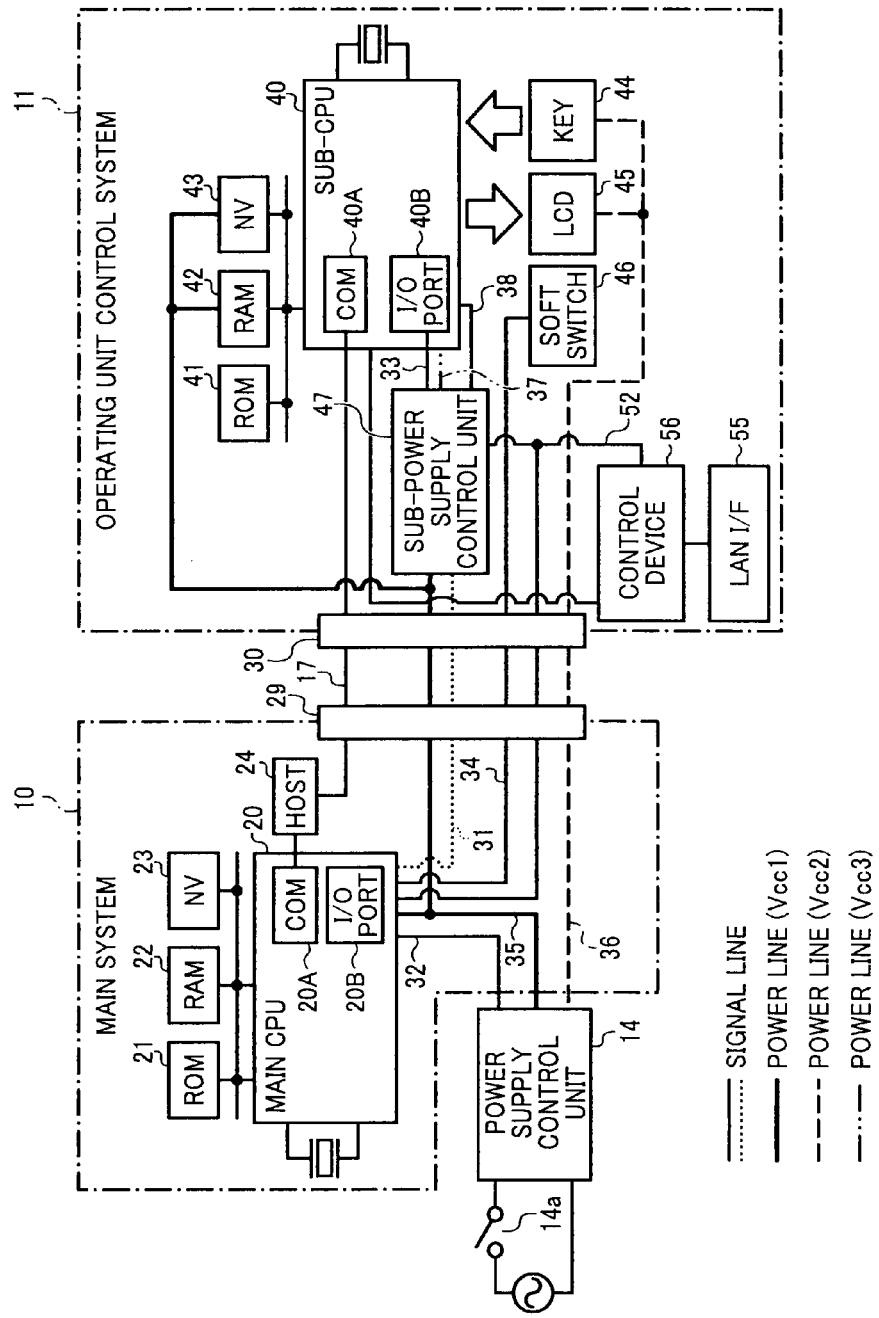
FIG. 8 is a view of a configuration of an image forming apparatus of a fourth embodiment of the present invention.

FIG. 8 is a view of a configuration of an image forming apparatus according to a fourth embodiment of the present invention. In the fourth embodiment, explanation of the part common to that in the image forming apparatus 1 according to the first embodiment is omitted, and only different points will be explained.

As shown in FIG. 8, the image forming apparatus according to the fourth embodiment further includes a LAN I/F 55 and a control device 56 in the operating unit control system 11 in the configuration according to the first embodiment (FIG. 2), and in the power-saving mode, when the control device 56 detects that data is input to the LAN I/F 55, the sub power supply control unit 47 activates the sub CPU 40.

In FIG. 8, the LAN I/F 55 is an interface provided for enabling data communication in wireless or wired manner using LAN. The control device 56 outputs a network data reception detection signal indicating that data is input to the sub power supply control unit 47 and the main system 10 via the data line 52 when it detects that data is input to the LAN I/F 55.

Next, an operation when reception of data via LAN is detected in the power-saving mode will be explained. The operation of shifting to the power-saving mode is as same as that in the first embodiment. The image forming apparatus is in the power-saving mode (the operation mode designating signal designates power-saving mode ("H"), the power-saving mode shift possible/impossible signal indicates shift possible ("H"), and the power supply voltage for CPU (Vcc3) is the second voltage with which driving of the sub CPU 40 is not possible but retention of condition is possible).

When data is input to the LAN I/F 55 in the power-saving mode, the control device 56 outputs a network data reception detection signal indicating that data is input, to the sub power supply control unit 47 and the main system 10 via the data line 52 when it detects that data is input to the LAN I/F 55.

When the network data reception detection signal is input, the sub power supply control unit 47 raises the power supply voltage for CPU (Vcc3) from the second voltage to the first voltage with which driving of the sub CPU 40 is possible, and outputs an activation signal to the sub CPU 40 via the data line 38 when the power supply voltage for CPU (Vcc3) reaches the first voltage. The sub CPU 40 is activated by detecting the activation signal by external interrupt, and following to the activation, it outputs a power-saving mode shift possible/impossible signal ("L") indicating the condition that shifting to the power-saving mode is impossible, to the sub power supply control unit 47, and then is ready for the next shifting to the power-saving mode.

According to the fourth embodiment, in the power-saving mode, when the control device 56 detects that data is received by the LAN I/F 55, the sub power supply control unit 47 raises driving voltage of the sub CPU 40 to the first voltage, and sends an activation signal to the sub CPU 40 and activates the same. Therefore, returning from the power-saving mode to the normal operation mode is achieved in a shorter time compared to the case where after the main system 10 detects reception of data by the LAN I/F 55, the operation mode designating signal is changed, and the driving voltage of the sub CPU 40 is raised to the first voltage.

Figure 9:
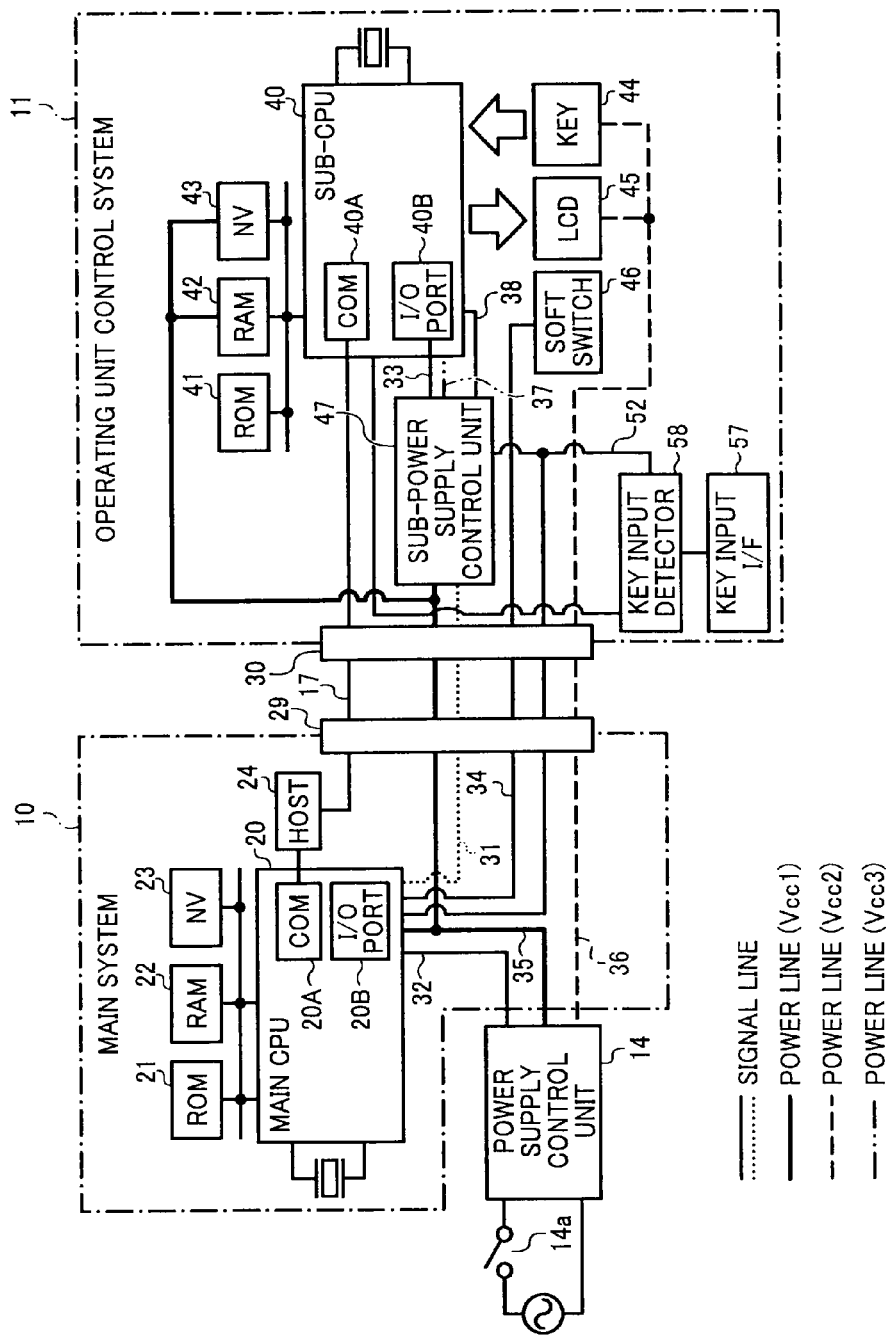
FIG. 9 is a view of a configuration of an image forming apparatus of a fifth embodiment of the present invention.

FIG. 9 is a view of a configuration of an image forming apparatus according to a fifth embodiment of the present invention. In the fifth embodiment, explanation of the part common to that in the image forming apparatus 1 according to the first embodiment is omitted, and only different points will be explained.

As shown in FIG. 9, the image forming apparatus according to the fifth embodiment further includes a key input I/F 57 and a key input detector 58 in the operating unit control system 11, in the configuration according to the first embodiment (FIG. 2), and in the power-saving mode, when the control device 56 detects that data is input to the key input I/F 57, the sub power supply control unit 47 activates the sub CPU 40.

In FIG. 9, the key input I/F 57 is an interface provided for key input. The key input detector 58 outputs a key input detection signal indicating that key input is made, to the sub power supply control unit 47 and the main system 10 via the data line 52 when it detects key input made on the key input I/F 57.

Next, an operation when key input is detected in the power-saving mode will be explained. The operation of shifting to the power-saving mode is as same as that in the first embodiment. The image forming apparatus is in the power-saving mode (the operation mode designating signal designates power-saving mode ("H"), the power-saving mode shift possible/impossible signal indicates shift possible ("H"), and the power supply voltage for CPU (Vcc3) is the second voltage with which driving of the sub CPU 40 is not possible but retention of condition is possible).

When key input is made on the key input I/F 57 in the power-saving mode, the key input detector 58 detects that key input is made on the key input I/F 57, and outputs a key input detection signal indicating that key input is made, to the sub power supply control unit 47 and the main system 10 via the data line 52.

When the key input detection signal is input, the sub power supply control unit 47 raises the power supply voltage for CPU (Vcc3) from the second voltage to the first voltage with which driving of the sub CPU 40 is possible, and outputs an activation signal to the sub CPU 40 via the data line 38 when the power supply voltage for CPU (Vcc3) reaches the first voltage. The sub CPU 40 is activated by detecting the activation signal by external interrupt, and following the activation, it outputs a power-saving mode shift possible/impossible signal ("L") indicating the condition that shifting to the power-saving mode is impossible, to the sub power supply control unit 47, and then is ready for the next shifting to the power-saving mode.

According to the fifth embodiment, in the power-saving mode, when the control device 56 detects that data input is made on the key input I/F 57, the sub power supply control unit 47 raises the driving voltage of the sub CPU 40 to the first voltage, and sends an activation signal to the sub CPU 40 to activate the same. Therefore, returning from the power-saving mode to the normal operation mode is achieved in a shorter time compared to the case where after the main system 10 detects key input, the operation mode designating signal is changed, and the driving voltage of the sub CPU 40 is raised to the first voltage.

Figure 10:
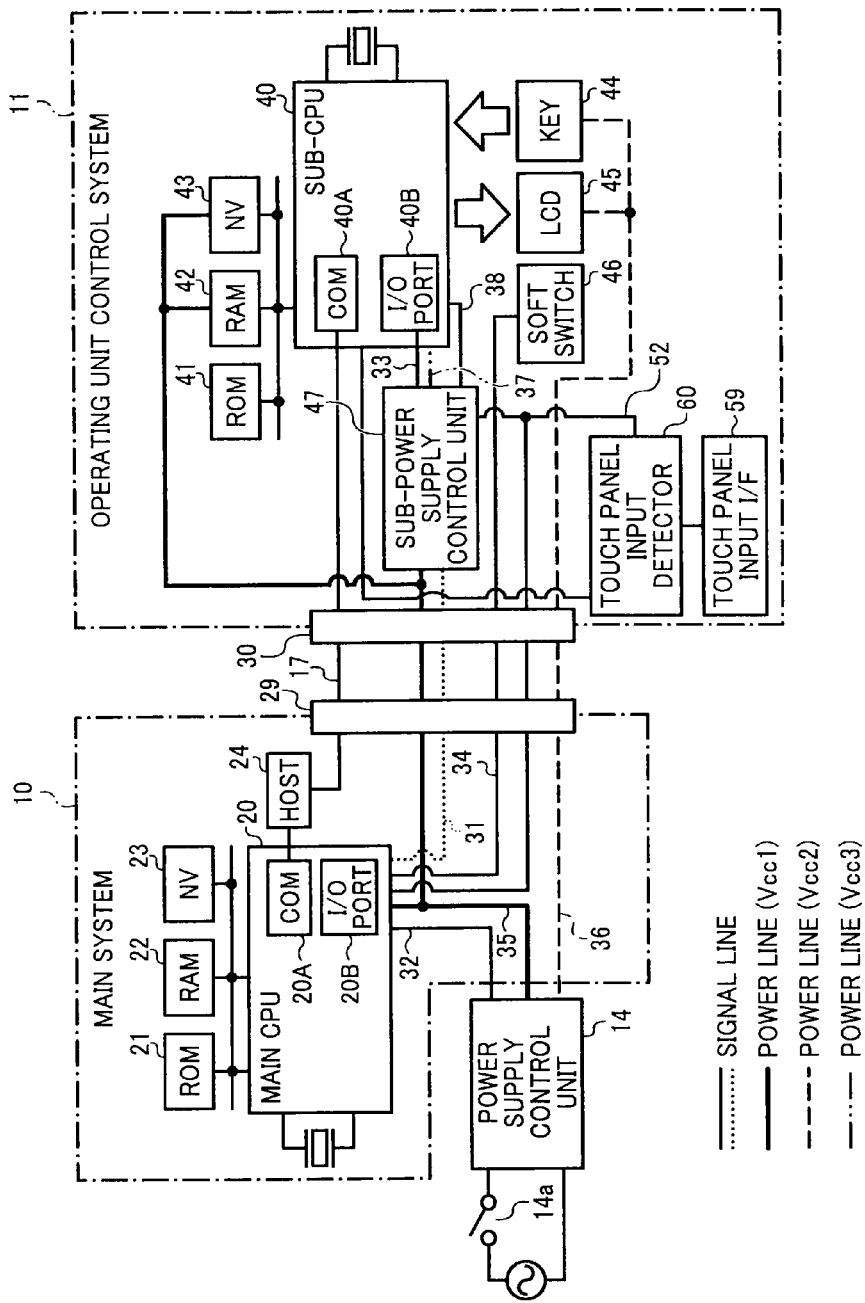
FIG. 10 is a view of a configuration of an image forming apparatus of a sixth embodiment of the present invention.

FIG. 10 is a view of a configuration of an image forming apparatus according to a sixth embodiment of the present invention. In the sixth embodiment, explanation of the part common to that in the image forming apparatus 1 according to the first embodiment is omitted, and only different points will be explained.

As shown in FIG. 10, the image forming apparatus according to the sixth embodiment further includes a touch panel input I/F 59 and a touch panel input detector 60 in the operating unit control system 11, in the configuration according to the first embodiment (FIG. 2), and in the power-saving mode, when the touch panel input detector 60 detects that touch panel input is made, the sub power supply control unit 47 activates the sub CPU 40.

In FIG. 10, the touch panel input I/F 59 has a touch panel, and is an interface provided for touch panel input. The touch panel input detector 60 outputs a touch panel input detection signal indicating that touch panel input is made, to the sub power supply control unit 47 and the main system 10 via the data line 52, when detecting that touch panel input is made on the touch panel input I/F 59.

Next, an operation when touch panel input is detected in the power-saving mode will be explained. The operation of shifting to the power-saving mode is as same as that in the first embodiment. The image forming apparatus is in the power-saving mode (the operation mode designating signal designates power-saving mode ("H"), the power-saving mode shift possible/impossible signal indicates shift possible ("H"), and the power supply voltage for CPU (Vcc3) is the second voltage with which driving of the sub CPU 40 is not possible but retention of condition is possible).

When touch panel input is made on the touch panel input I/F 59 in the power-saving mode, the touch panel input detector 60 outputs a touch panel input detection signal indicating that touch panel input is made, to the sub power supply control unit 47 and the main system 10 via the data line 52.

When the touch panel input detection signal is input, the sub power supply control unit 47 raises the power supply voltage for CPU (Vcc3) from the second voltage to the first voltage with which driving of the sub CPU 40 is possible, and outputs an activation signal to the sub CPU 40 via the data line 38 when the power supply voltage for CPU (Vcc3) reaches the first voltage. The sub CPU 40 is activated by detecting the activation signal by external interrupt, and following the activation, it outputs a power-saving mode shift possible/impossible signal ("L") indicating the condition that shifting to the power-saving mode is impossible, to the sub power supply control unit 47, and then is ready for the next shifting to the power-saving mode.

According to the sixth embodiment, in the power-saving mode, when the touch panel input detector 60 detects touch panel input in the power-saving mode, the sub power supply control unit 47 raises the driving voltage of the sub CPU 40 to the first voltage, and sends an activation signal to the sub CPU 40 to activate the same. Therefore, returning from the power-saving mode to the normal operation mode is achieved in a shorter time compared to the case where after the main system 10 detects touch panel input, the operation mode designating signal is changed, and the driving voltage of the sub CPU 40 is raised to the first voltage.

Figure 11:
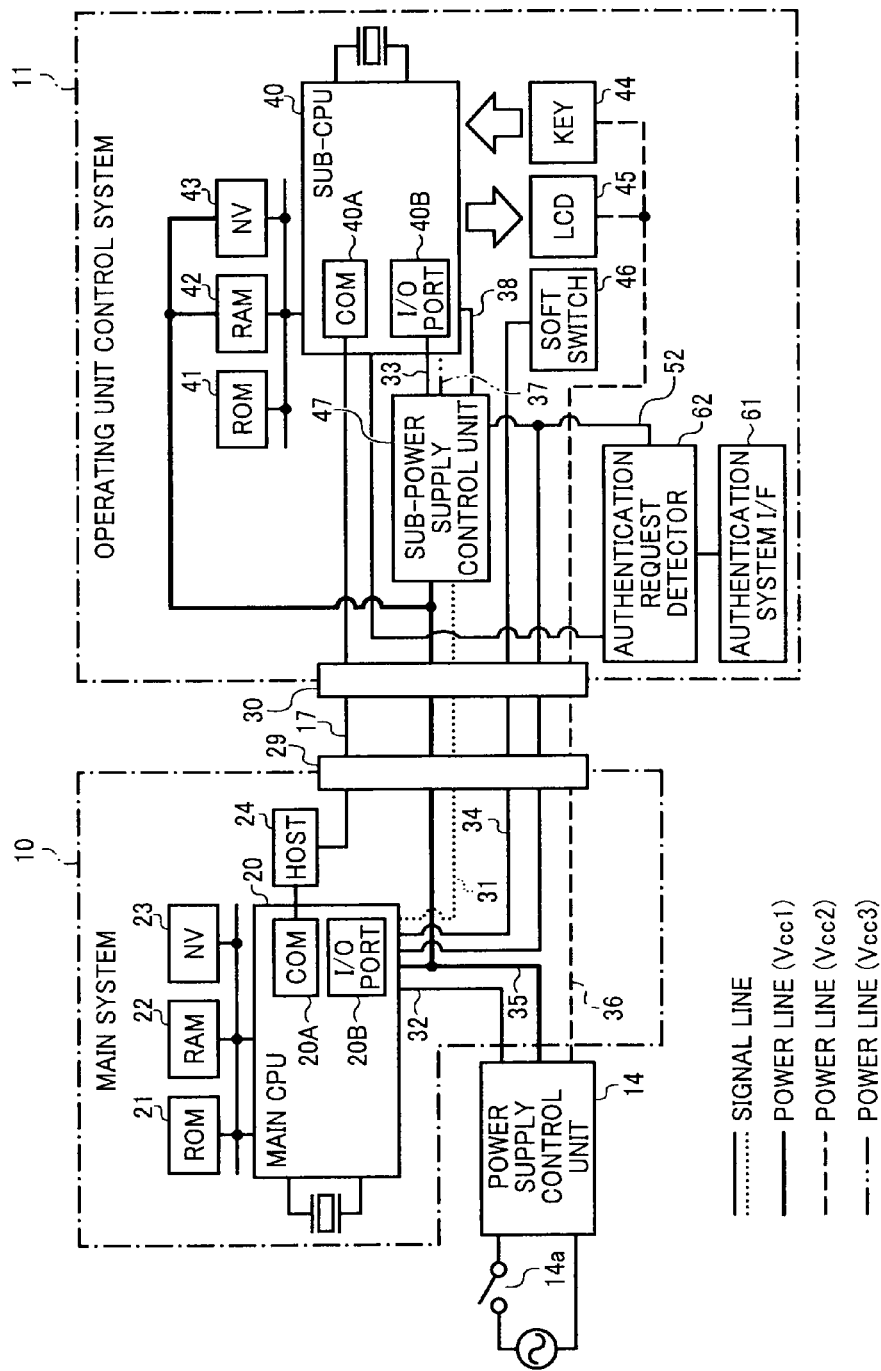
FIG. 11 is a view of a configuration of an image forming apparatus of a seventh embodiment of the present invention.

FIG. 11 is a view of a configuration of an image forming apparatus according to a seventh embodiment of the present invention. In the seventh embodiment, explanation of the part common to that in the image forming apparatus 1 according to the first embodiment is omitted, and only different points will be explained.

As shown in FIG. 11, the image forming apparatus according to the seventh embodiment further includes an authentication system I/F 61 and an authentication request detector 62 in the operating unit control system 11 in the configuration according to the first embodiment (FIG. 2), and in the power-saving mode, when the authentication request detector 62 detects that a user authentication request is input, the sub power supply control unit 47 activates the sub CPU 40.

In FIG. 10, the authentication system I/F 61 is an interface provided for inputting a user authentication request. When the authentication request detector 62 detects that a user authentication request is input to the authentication system I/F 61, it outputs a user authentication request detection signal indicating that a user authentication request is input, to the sub power supply control unit 47 and the main system 10 via the data line 52.

Next, an operation when user authentication request input is detected in the power-saving mode will be explained. The operation of shifting to the power-saving mode is as same as that in the first embodiment. The image forming apparatus is in the power-saving mode (the operation mode designating signal designates power-saving mode ("H"), the power-saving mode shift possible/impossible signal indicates shift possible ("H"), and the power supply voltage for CPU (Vcc3) is the second voltage with which driving of the sub CPU 40 is not possible but retention of condition is possible).

When a user authentication request is input to the authentication system I/F 61 in the power-saving mode, the authentication request detector 62 outputs a user authentication request detection signal indicating that a user authentication request is input, to the sub power supply control unit 47 and the main system 10 via the data line 52, when it detects that user authentication request is input to the authentication system I/F 61.

When the user authentication request detection signal is input, the sub power supply control unit 47 raises the power supply voltage for CPU (Vcc3) from the second voltage to the first voltage with which driving of the sub CPU 40 is possible, and outputs an activation signal to the sub CPU 40 via the data line 38 when the power supply voltage for CPU (Vcc3) reaches the first voltage. The sub CPU 40 is activated by detecting the activation signal by external interrupt, and following the activation, it outputs a power-saving mode shift possible/impossible signal ("L") indicating the condition that shifting to the power-saving mode is impossible, to the sub power supply control unit 47, and then is ready for the next shifting to the power-saving mode.

According to the seventh embodiment, in the power-saving mode, when the authentication request detector 62 detects that a user authentication request is input, the sub power supply control unit 47 raises the driving voltage of the sub CPU 40 to the first voltage, and sends an activation signal to the sub CPU 40 to activate the same. Therefore, returning from the power-saving mode to the normal operation mode is achieved in a shorter time compared to the case where after the main system 10 detects user authentication request input, the operation mode designating signal is changed, and the driving voltage of the sub CPU 40 is raised to the first voltage.

In the embodiments, the case of a power control system according to the present invention is applied to an image forming apparatus was explained, however, the present invention may be applied broadly to the cases of power control is conducted by various apparatuses such as information processing device, without limited to the above.

According to an aspect of the present invention, a power control system capable of realizing power saving by a low-cost and small-scale circuit configuration can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power control system comprising:
   a main system that controls the power control system;
   a sub system that is connected to the main system in a communicatable manner and that implements various functions; and
   a power control unit, wherein
   the main system includes a power mode designating unit that outputs an operation mode designating signal that designates either one of a normal operation mode and a power-saving mode to the sub system, and
   the sub system includes
      a control unit that controls the sub system, and
      a sub power control unit that supplies, in the normal operation mode, a first voltage with which driving of the control unit is possible to the control unit, and while in the power-saving mode, supplies a second voltage that is lower than the first voltage, with which driving of the control unit is impossible but retention of a condition is possible, to the control unit, the power control unit supplying a voltage to the sub power control unit,
      when shifting to the power-saving mode is possible, the control unit outputs a power-saving mode shift enable signal indicating that shifting to the power-saving mode is possible to the sub power control unit, and
      when the operation mode designating signal designates the power-saving mode and the power-saving mode shift enable signal indicates that shifting to the power-saving mode is possible, the sub power control unit supplies the second voltage to the control unit.

2. The power control system according to claim 1, wherein in shifting from the power-saving mode to the normal operation mode, upon detecting that a driving voltage of the control unit reaches the first voltage, the sub power control unit outputs an activation signal for activating the control unit to the control unit.

3. The power control system according to claim 1, wherein the sub system further includes
   a universal serial bus interface, and
   a detecting unit that detects a detection signal indicating a connection of a universal serial bus device to the universal serial bus interface, and
   upon detecting the detection signal in the power-saving mode, the detecting unit outputs the detection signal to the sub power control unit, and
   upon receiving the detection signal, the sub power control unit sets a driving voltage of the control unit to the first voltage, and outputs an activation signal for activating the control unit to the control unit.

4. The power control system according to claim 1, wherein the sub system further includes
   a memory card interface, and
   a detecting unit that detects a detection signal indicating a connection of a memory card to the memory card interface, and
   upon detecting the detection signal in the power-saving mode, the detecting unit outputs the detection signal to the sub power control unit, and
   upon receiving the detection signal, the sub power control unit sets a driving voltage of the control unit to the first voltage, and outputs an activation signal for activating the control unit to the control unit.

5. The power control system according to claim 1, wherein the sub system further includes
 a local area network interface, and
 a detecting unit that detects a detection signal indicating a reception of data via the local area network interface, and
upon detecting the detection signal in the power-saving mode, the detecting unit outputs the detection signal to the sub power control unit, and
upon receiving the detection signal, the sub power control unit sets a driving voltage of the control unit to the first voltage, and outputs an activation signal for activating the control unit to the control unit.

6. The power control system according to claim 1, wherein the sub system further includes
 a key input interface, and
 a detecting unit that detects a detection signal indicating a key input to the key input interface, and
upon detecting the detection signal in the power-saving mode, the detecting unit outputs the detection signal to the sub power control unit, and
upon receiving the detection signal, the sub power control unit sets a driving voltage of the control unit to the first voltage, and outputs an activation signal for activating the control unit to the control unit.

7. The power control system according to claim 1, wherein the sub system further includes
 a touch panel input interface, and
 a detecting unit that detects a detection signal indicating a touch panel input to the touch panel input interface, and
upon detecting the detection signal in the power-saving mode, the detecting unit outputs the detection signal to the sub power control unit, and
upon receiving the detection signal, the sub power control unit sets a driving voltage of the control unit to the first voltage, and outputs an activation signal for activating the control unit to the control unit.

8. The power control system according to claim 1, wherein the sub system further includes
 a user authentication interface, and
 a detecting unit that detects a detection signal indicating an input of a user authentication request to the user authentication interface, and
upon detecting the detection signal in the power-saving mode, the detecting unit outputs the detection signal to the sub power control unit, and
upon receiving the detection signal, the sub power control unit sets a driving voltage of the control unit to the first voltage, and outputs an activation signal for activating the control unit to the control unit.

9. The power control system according to claim 1, wherein the sub system is an operating unit control system for providing a user interface function.

* * * * *